(12) United States Patent
Habel et al.

(10) Patent No.: US 7,288,730 B2
(45) Date of Patent: Oct. 30, 2007

(54) CABLE LEAD-THROUGH DEVICE

(75) Inventors: Martin Habel, Bretzfeld (DE);
Wolfgang Sohn, Esslingen (DE); Lutz Scharf-Martini, Schorndorf (DE);
Rainer Funk, Wüstenrot (DE)

(73) Assignee: Murrplastik Systemtechnick GmbH, Oppenweiler (DE)

( * ) Notice: Subject to any disclaimer, the term of this patent is extended or adjusted under 35 U.S.C. 154(b) by 0 days.

(21) Appl. No.: 10/550,785

(22) PCT Filed: Jan. 22, 2004

(86) PCT No.: PCT/EP2004/000479

§ 371 (c)(1),
(2), (4) Date: Sep. 27, 2005

(87) PCT Pub. No.: WO2004/086583

PCT Pub. Date: Oct. 7, 2004

(65) Prior Publication Data

US 2006/0185875 A1    Aug. 24, 2006

(30) Foreign Application Priority Data

Mar. 27, 2003   (DE) ................. 103 13 989

(51) Int. Cl.
*H02G 3/18* (2006.01)
(52) U.S. Cl. .............. 174/650; 174/152 G; 174/153 G; 174/152 R; 16/2.1; 16/2.2
(58) Field of Classification Search ............. 174/650, 174/656, 659, 660, 663, 668, 152 G, 153 G, 174/142, 152 R, 153 R, 151, 362, 657, 72 A; 16/2.1, 2.2; 248/56, 68.1
See application file for complete search history.

(56) References Cited

U.S. PATENT DOCUMENTS

| | | | | | |
|---|---|---|---|---|---|
| 3,397,431 | A | * | 8/1968 | Walker | 248/68.1 |
| 3,489,440 | A | * | 1/1970 | Nils | 248/56 |
| 3,682,422 | A | * | 8/1972 | Evans | 248/68.1 |

(Continued)

FOREIGN PATENT DOCUMENTS

DE       44 34 202       4/1927

(Continued)

*Primary Examiner*—Angel R. Estrada
(74) *Attorney, Agent, or Firm*—Collard & Roe, P.C.

(57) ABSTRACT

The invention relates to a device for covering and sealing a hole (10) through a wall provided for leading cables therethrough, said hole being provided in, for example, a switchgear cabinet. The device comprises a retaining frame (16), which can be fastened to the edge (66) of the hole through the wall (12), and comprises a number of bushes (30, 31), which are made of elastomeric material, can be removeably inserted inside frame openings (28), and which can be fixed therein. A least one part of the bushes (30, 31) is provided with at least one through opening for a cable. In order to equip the cable leadthrough with cables in a particularly easy manner and to be able to mount it on the switchgear cabinet, the invention provides that the frame openings (28) are open on one side for inserting the bushes (30, 31). In addition, one of the bushes (31), which can be inserted into the frame openings, can be arrested in a direction of insertion in the area of the sidewalls (36) that delimit the frame openings (34).

42 Claims, 5 Drawing Sheets

U.S. PATENT DOCUMENTS

| | | | | |
|---|---|---|---|---|
| 3,742,119 | A | * | 6/1973 | Newman .................... 174/656 |
| 3,857,136 | A | * | 12/1974 | Dean ......................... 16/2.1 |
| 4,677,253 | A | * | 6/1987 | Blomqvist ................. 174/362 |
| 4,702,444 | A | * | 10/1987 | Beele ......................... 174/151 |
| 4,771,136 | A | * | 9/1988 | Graver et al. ............... 174/362 |
| 4,919,372 | A | * | 4/1990 | Twist et al. ................... 248/56 |
| 5,098,047 | A | * | 3/1992 | Plumley ..................... 248/68.1 |
| 5,108,060 | A | * | 4/1992 | Beele ......................... 248/56 |
| 6,521,840 | B1 | * | 2/2003 | Kreutz ....................... 174/657 |
| 6,717,055 | B2 | * | 4/2004 | Kato ....................... 174/72 A |
| 7,005,579 | B2 | * | 2/2006 | Beele ......................... 16/2.1 |

FOREIGN PATENT DOCUMENTS

| | | |
|---|---|---|
| DE | 32 24 977 | 1/1984 |
| DE | 37 15 945 | 1/1988 |
| DE | 36 19 183 | 10/1989 |
| DE | 91 01 257 | 6/1991 |
| DE | 197 21 659 | 11/1998 |
| GB | 2 337 870 | 12/1999 |
| WO | WO 99/06747 | 2/1999 |

* cited by examiner

Fig.1

CABLE LEAD-THROUGH DEVICE

CROSS REFERENCE TO RELATED APPLICATIONS

Applicant claims priority under 35 U.S.C. §119 of German Application No. 103 13 989.3 filed on Mar. 27, 2003. Applicant also claims priority under 35 U.S.C. §365 of PCT/EP2004/000479 filed on Jan. 22, 2004. The international application under PCT article 21(2) was not published in English.

The invention relates to a device for covering and sealing a hole through a wall, intended for leading cables through the latter, for example in a switchgear cabinet. Known devices of this type have a retaining frame which can be fastened to the edge of the hole through the wall, and several bushes made of elastomer material, which can be removably inserted into frame openings and fixed in place there. At least one part of the bushes is provided with at least one passage opening for a cable, which is accessible from the outside by way of an edge gap.

The frame openings are open on one side for insertion of the bushes, and at least one of the bushes that can be inserted into the frame openings, in each instance, can be fixed in place in the insertion direction, in the region of the side walls that delimit the frame opening.

Devices of this type serve to introduce cables provided with plug-in devices or the like into a switchgear cabinet, without having to release the plug-in device from the cables. The devices furthermore have the task of covering and sealing the hole through the wall after the cables have been introduced. The hole through the wall is generally configured to be rectangular, and is so large that the cables with the plug-in devices can be introduced.

Cable lead-throughs are known (DE-A-44 34 202, WO99/06747), the frames of which consist of several frame parts made of rigid plastic material, which complement one another to form a complete frame. The frame parts have openings that face one another in pairs and have an open edge, which openings complement one another to form closed frame openings for accommodating the elastomer bushes, in the connected state of the frame parts. The bushes, in turn, are provided with passage openings for the cables, which are accessible from the outside by way of edge slits that can be widened elastically. The frame parts equipped with the bushes set onto the cables in the loose state are connected with one another by means of screw connections, while the bushes are pressed together. Subsequently, the frames pre-finished in this manner are fastened to the switchgear cabinet in the region of the hole in the wall, in such a manner that the one cable ends point into the interior of the switchgear cabinet. In the case of the known cable lead-throughs, it is felt to be a disadvantage that the handling of the divided frames during pre-assembly is relatively complicated.

A device of the type stated initially is known from GB 2 337 870 A. It has a frame that can be attached to the edge of the hole through the wall. The frame has an opening into which several cable bushes can be inserted, some of which are provided with one or more passage openings for a cable. On one side, the retaining frame has a flap by way of which the frame opening can be opened on one side for insertion of the bushes. By closing the flap, the bushes inserted into the frame opening are fixed in place. In this device, as well, the retaining frame is therefore structured in two parts, so that handling is relatively complicated.

Proceeding from this, the invention is based on the task of developing a cable lead-through device for switchgear cabinets that can be equipped with cables and mounted on the switchgear cabinet in particularly simple manner.

To accomplish this task, the combination of characteristics indicated in claim 1 is proposed. Advantageous embodiments and further developments of the invention are evident from the dependent claims.

The solution according to the invention essentially consists in the fact that instead of the divided frame elements, a one-piece retaining frame is used, the frame openings of which are preferably open on one side for insertion of the bushes, preferably crosswise to the passage opening, whereby at least one of the bushes that can be inserted into the frame openings, in each instance, can be arrested, preferably arrested in the insertion direction, in the region of the side walls that delimit the frame openings, preferably arrested in place. For that, the side walls of the frame openings are provided with catch depressions for accommodating catch organs that project laterally, partially above the surface of the bush. In addition the bushes can be provided with lateral catch depressions for accommodating catch organs that project towards the inside, partially above the side walls.

An advantageous embodiment of the invention provides that the catch organs are embedded at least partially into the elastomer bush material. It is advantageous if the catch organs are configured with bending elasticity. They can consist of a rigid or rigid elastic component, for example of plastic or metal, that is embedded into the elastomer bush material. It is practical if a cavity is located within the bush material, into which the catch organ dips temporarily during the engagement process. Another preferred embodiment of the invention provides that at least one part of the bushes consists of two bush halves that face one another on the side of the passage opening, and mutually complement one another, which have one of the catch organs or one of the catch depressions on sides facing away from one another, in each instance. In this connection, it is practical if the two bush halves are configured and disposed as mirror images of one another. Preferably, the bush halves are connected with one another, at one join, preferably in one piece, in hinge-like manner, and open on the side that lies opposite the join. The open side can be bent open about the hinge-like connection, so that a cable can be introduced onto the passage opening radially from the outside. It is advantageous if the bush halves are connected in one piece with one another by way of a film hinge. The catch organs can be embedded in one of the bush halves, in each instance, as separate components. Alternatively to this, the catch organs can be connected with one another by way of a stay that penetrates or surrounds the bush.

It is practical if the catch organs have a spring stay that is oriented parallel to the side wall of the bush in question and can be bent into a cavity in the bush material, and a catch cam that is molded onto the free end of the spring stay, whereby the catch cam can have a run-up incline that faces in the insertion direction and a catch surface that follows the run-up incline, at the back, facing opposite the insertion direction. It is practical if the catch depressions in the side walls are formed to be complementary to the catch cams.

It is practical if the side walls of the frame openings that lie opposite one another are oriented parallel to one another, whereby the catch depressions or catch projections on the side walls of each frame opening lie opposite one another in a mirror image.

According to another preferred embodiment of the invention, the passage openings of the bushes are disposed outside the center in the insertion direction, forming two wall parts of unequal thickness. In this connection, it is practical if the catch organs are disposed asymmetrically on the side of the thicker wall part, in the region of the side walls.

Another preferred embodiment of the invention provides that two bushes of a frame opening, in each instance, are disposed in such a manner that they rest against one another with their thinner, preferably slit wall parts, and face away from one another with their thicker wall parts, which are connected with one another in hinge-like manner. In this connection, only one of the two bushes can be arrested in place, in each instance, forming the closure piece with the side walls of the frame opening.

The retaining frame can be fixed in place at the edge of the hole through the wall, preferably screwed on. Another preferred embodiment of the invention provides that the essentially rectangular retaining frame has two closed narrow side edges and only one closed broad side edge. To fix the retaining frame in place on the wall, the retaining frame can be provided with fixation tabs that project towards the side of the hole through the wall and can be arrested at the edge of the hole through the wall, in the region of its closed narrow side edges, whereby the fixation tabs can be configured as loose components that are fixed in place with a positive lock in structurally adapted insertion openings in the closed narrow side edges of the retaining frame. An advantageous embodiment of the invention provides that the fixation tabs have a catch pocket that engages into the edge of the hole through the wall, as well as a catch organ that can engage on the retaining frame in the region of the insertion opening, as well as an activation organ that projects beyond the retaining frame on the front, to produce or release the catch connection with the edge of the hole through the wall.

In the following, the invention will be explained in greater detail using the exemplary embodiments shown schematically in the drawing. These show:

FIG. 2*a* the cable lead-through device according to FIG. 1, which is only partially equipped with bushes, for illustrative purposes;

FIGS. 2*b*, *c*, and *d*, a top view and two side views of the cable lead-through device according to FIG. 2*a*, equipped with only two bushes;

FIG. 3*a* an illustrative representation of a two-part cable bush for insertion into the cable lead-through device according to FIGS. 1 and 2;

FIGS. 3*b*, *c*, and *d*, three side views of the two-part bush according to FIG. 3*a*;

The components shown in the figures, all together, form a cable lead-through device that is intended for insertion into a hole 10 through a wall, in an outer wall 12 of a switchgear cabinet. The device serves to introduce cables provided with plug-in devices or the like through the hole 10 through the wall, into the switchgear cabinet, without having to release the plug-in devices from the cables. The hole 10 through the wall is configured to be rectangular and is so large that the cables can be introduced with the plug-in devices.

The cable lead-through device 14 has an essentially rectangular retaining frame 16, which is closed on the two narrow side edges 18 and the broad side edge 20, and open on the opposite side 22. The retaining frame 16 has several ribs 24 that are oriented parallel to the narrow side edges 18, which ribs delimit a corresponding number of frame openings 26 for accommodating bushes 30, 31 made of elastomer material. The frame openings 28 are open towards the side 22 of the retaining frame 16, so that the bushes 30, 31 can be pushed into the frame openings 28 from the open side 22. The parallel guidance of the bushes 30, 31 in the region of the frame openings 28 takes place in a manner similar to the case of DE-C 36 19 183, by means of edge beads 69 on the outside of the bushes 30, which engage in the side walls 36 at the edge.

The bushes 30, 31 have a passage opening 32 for a cable, not shown, which is accessible radially from the outside, in each instance. In order to be able to introduce the cables into the passage openings 28, the bushes 30, 31 are either provided with edge openings 34 that can be widened elastically (FIG. 4*a* to *e*) or they are configured in two parts (FIG. 3*a* to *d*).

A peculiarity of the cable lead-through devices shown consists in the fact that the bush 31 disposed close to the opening, in each instance, can be arrested in the insertion direction, in the region of the side walls 36 that delimit the frame openings 28. For this purpose, the side walls 36 of the frame openings 28 are provided with catch depressions 38 for accommodating catch organs 42 that project laterally partially beyond the bush surface 40. The catch organs 42 have a leaf-spring-like spring stay 44 oriented parallel to the bush wall 40 in question, and a catch cam 46 molded on at the free end of the spring stay. The catch cam 46 is provided with a run-up incline 48 that faces in the insertion direction, and a catch surface 50 that follows the run-up incline at the back, opposite the insertion direction. Within the bush material, a cavity 52 is formed and assigned to the catch organ 42, in each instance, into which the catch organ 42 temporarily dips during the engagement process. The catch depressions 38 in the side walls 36 are formed to be complementary to the catch cams 46.

In the case of the exemplary embodiment configured in FIG. 3*a* to *d*, the bushes 30, 31 consist of two bush halves 31', 31", facing one another on the side of the passage opening 32, configured as mirror images and mutually complementing one another, in which an independent catch organ 42 is embedded, in each instance. The bush halves 31', 31" can be connected in one piece with one another, at their joins 54, for example with a film hinge 55 that extends over the entire width in FIG. 3*b*, indicated symbolically, while they are open at their opposite joins 56, forming an insertion gap for the cables.

In the case of the exemplary embodiment shown in FIG. 4*a* to *e*, a one-piece bush 30, 31 of elastomer material is provided, which has an edge opening 34 that can be widened elastically, for introducing a cable into the passage opening 32, and whose catch organs 42 are connected with one another by way of a connecting stay 60 at the root 58 of their spring stays 44. In this connection, the connecting stay 60 can be embedded in the elastomer bush material. The catch cams 46 also have a run-up incline 48 and a catch surface 50, with which they can engage in the catch depressions 38 in the side walls 36 of the frame openings 28, which are configured to be complementary.

Figures 2A, 2B, 2C, 2D:
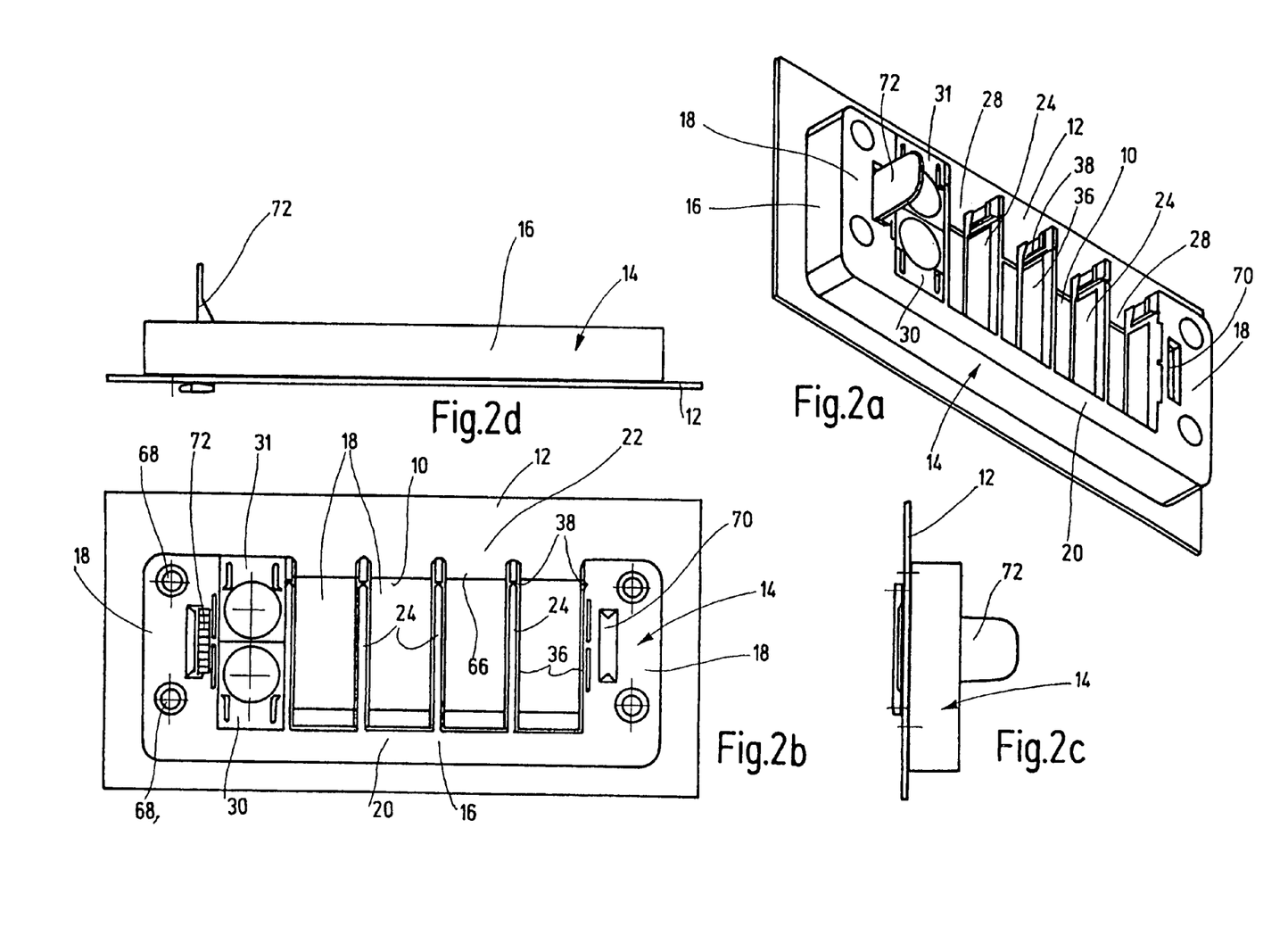
Figures 3A, 3B, 3C, 3D:
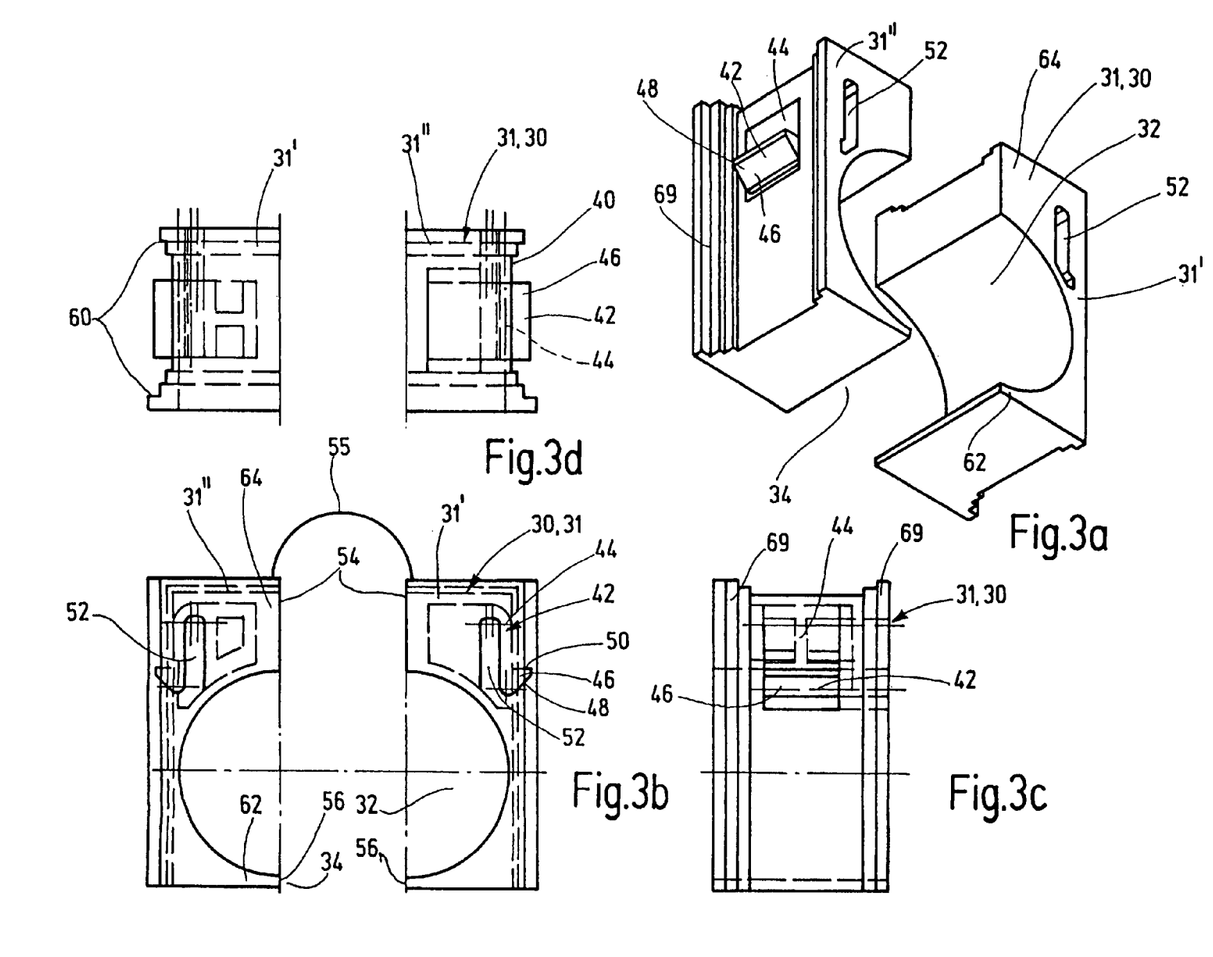
Figure 4A:
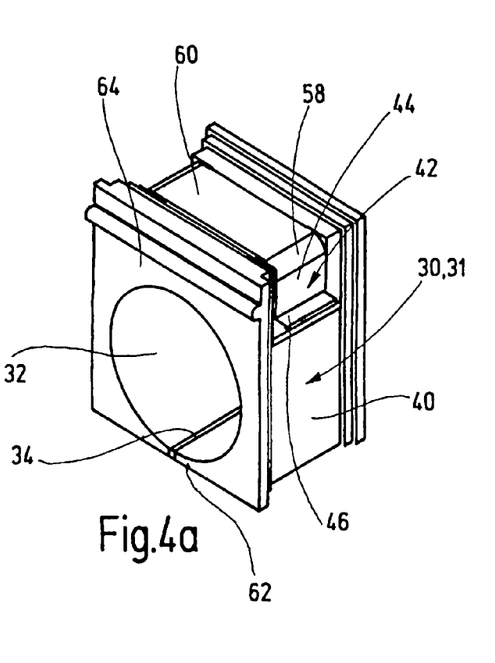
FIG. 4*a* an illustrative representation of a cable bush modified as compared with FIG. 3*a*, for insertion into the cable lead-through device according to FIGS. 1 and 2.
Figures 4B, 4C, 4D, 4E:
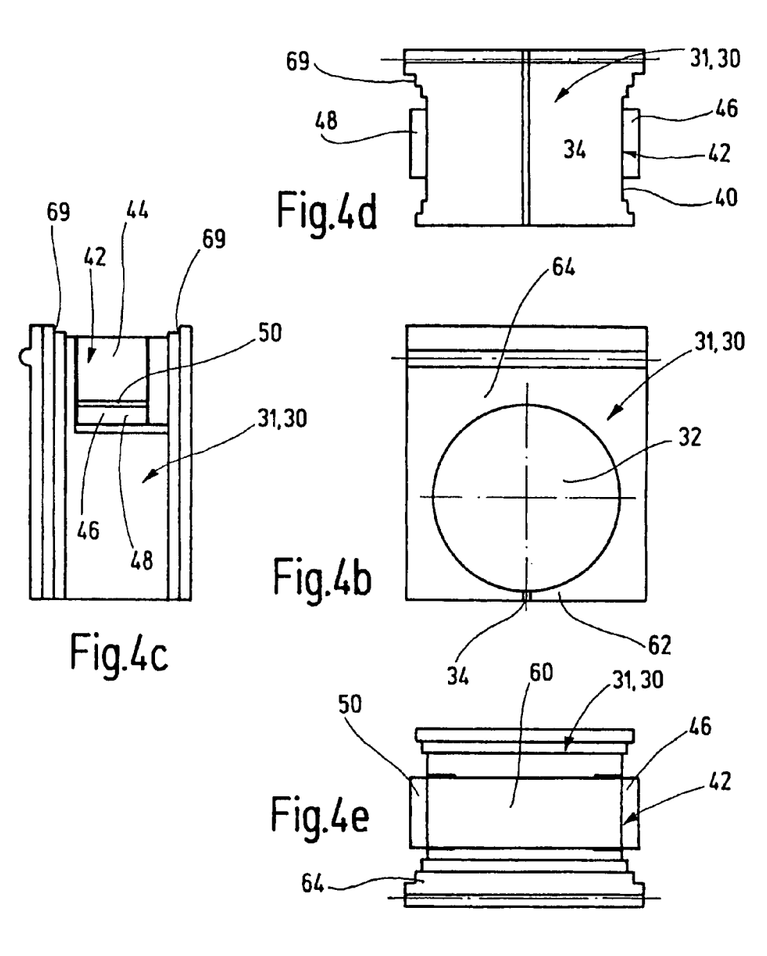
FIG. 4*b* to *e*, four side views of the cable bush according to FIG. 4*a*.
Figure 5A:
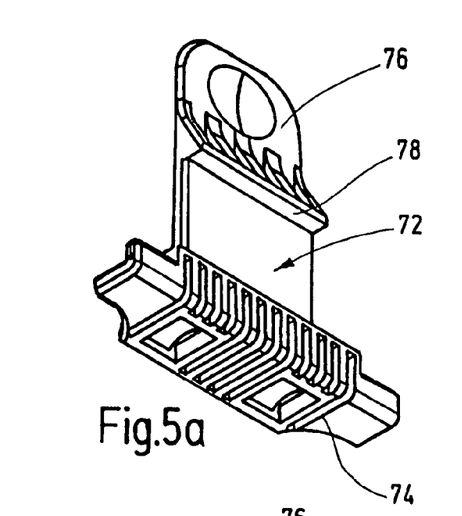
FIG. 5*a* an illustrative representation of a fixation tab for fastening the cable lead-through device in the region of the hole through the wall.
Figure 5B:
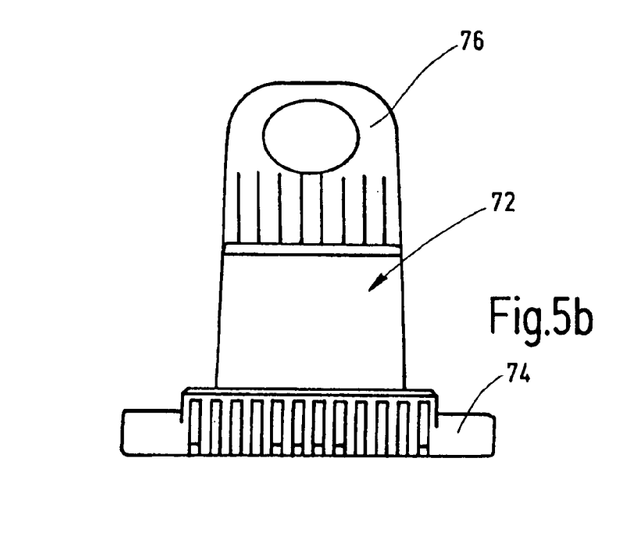
FIG. 5*b* to *d*, three side views of the fixation tab according to FIG. 5*a*.
Figure 5C:
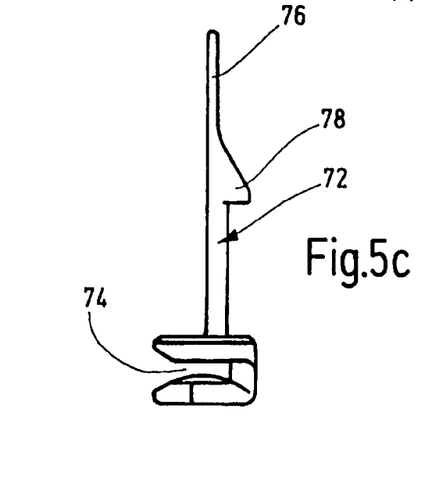
Figure 5D:
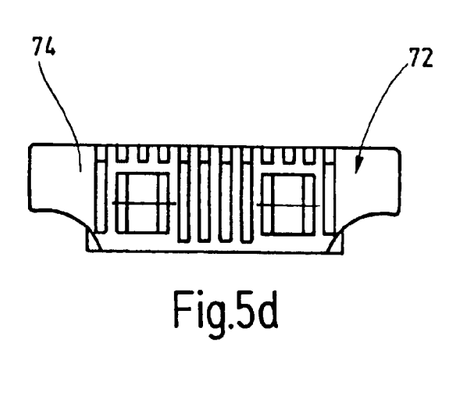

As is particularly evident from FIGS. 2b, 3b, and 4b, the passage openings 32 are disposed asymmetrically in the cable bushes, in the insertion direction. As a result, the bush wall 62 on the side of the edge opening 64 is configured to be thinner-walled than the bush wall 64 on the opposite side. There is sufficient space for the catch organs 42 in the thick-walled bush wall 64.

The thick-walled bush walls 34 overlap the edge 66 of the hole 10 through the wall 12 and are pressed against this edge during assembly, forming a seal (see FIG. 2b).

Fixation of the retaining frame 16 on the wall 12 can take place either by means of screws, which pass through four bores 68 towards the wall 10, disposed at the frame corners.

Figure 1:
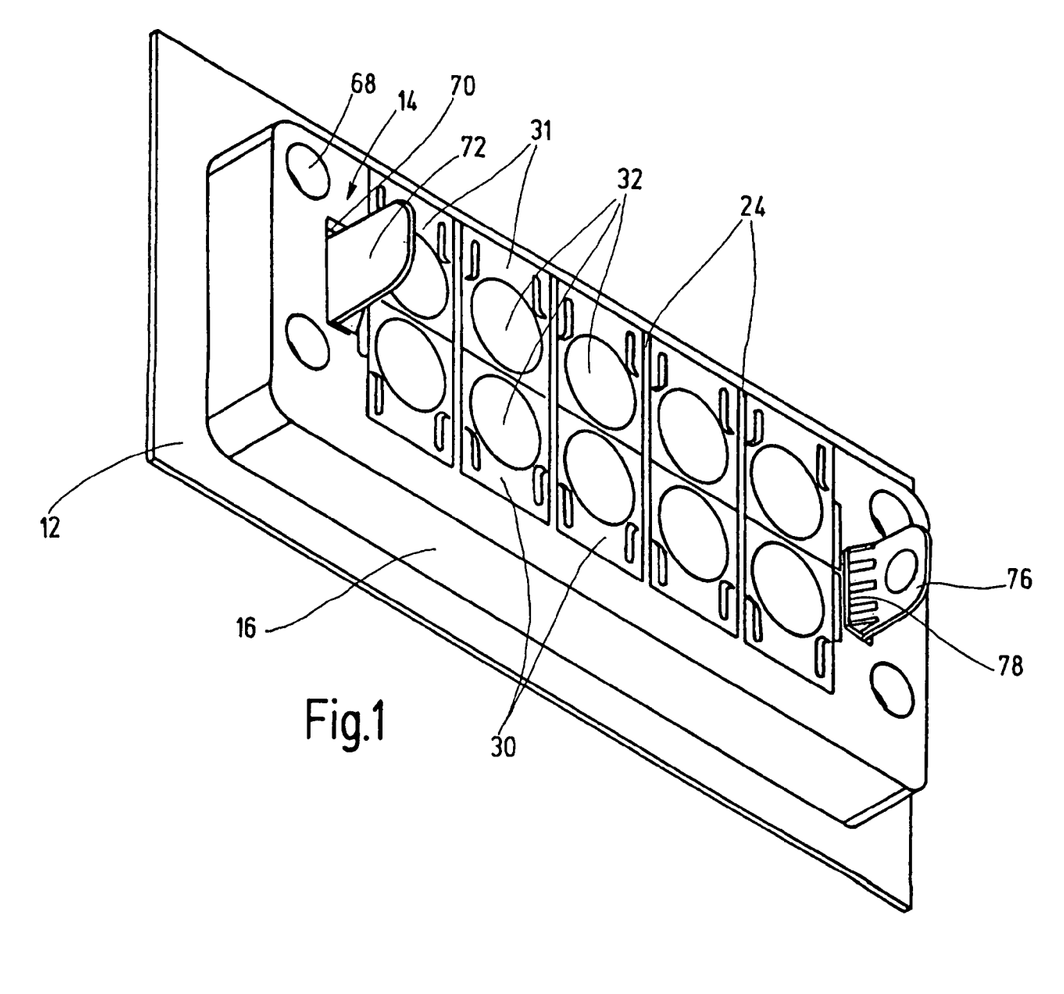
FIG. 1 a cable lead-through device completely equipped with bushes, mounted in a wall detail.

Alternatively to this, the exemplary embodiment shown in FIGS. 1, 2, and 5 has a simple plug-in connection for fixation of the retaining frame equipped with the bushes, in the region of the hole through the wall. For this purpose, the retaining frame 16 contains a slit-shaped pass-through opening 70 for a fixation tab 72, in each instance, in the region of its two narrow side walls 18. The fixation tab has a catch pocket 74 on its side facing the hole 10 through the wall, which surrounds the edge 66 of the hole through the wall 10, as well as an activation organ 76 that passes through the pass-through opening 70 towards the front. On the front, the fixation tab is additionally secured on the retaining frame 16 with a catch element 78 that projects beyond the edge of the pass-through opening 70.

In summary, the following should be stated: The invention relates to a device for covering and sealing a hole 10 through a wall intended for leading cables through the latter, for example in a switchgear cabinet. The device has a retaining frame 16 that can be fastened to the edge 66 of the hole through the wall 12, and several bushes 30, 31 made of elastomer material, which can be removably inserted inside frame openings 28, and fixed in place there. At least one part of the bushes 30, 31 is provided with at least one passage opening for a cable. In order to be able to equip the cable pass-through with cables and mount it on the switchgear cabinet in particularly simple manner, it is proposed, according to the invention, that the frame openings 28 are open on one side for insertion of the bushes 30, 31, and that one of the bushes 31 that can be inserted into the frame openings, in each instance, can be arrested in place in the insertion direction, in the region of the side walls that delimit the frame openings 34.

The invention claimed is:

1. A device for covering and sealing a hole provided for leading cables through a wall comprising:
    (a) a retaining frame fastenable to an edge of the hole;
    (b) a plurality of bushes made of an elastomeric material, each bush having a bush surface and at least one part comprising at least one passage opening for a cable; and
    (c) a plurality of frame openings, each frame opening being open on one side for insertion in an insertion direction of a respective one of the bushes;
    wherein at least one of the bushes insertable in the respective frame opening is fixable in place in the insertion direction near side walls delimiting the frame opening;
    wherein each side wall comprises a catch depression for accommodating catch organs projecting laterally partially above the bush surface.

2. The device according to claim 1, wherein each frame opening is open crosswise to the at least one passage opening.

3. The device according to claim 1, wherein the at least one bush can be arrested in the insertion direction.

4. The device according to claim 1, wherein the bushes are provided with lateral catch depressions or catch edges for accommodating catch organs on the side walls that project inward, partially above the side walls.

5. The device according to claim 1, wherein the catch organs are embedded at least partially in the bush material.

6. The device according to claim 1, wherein the catch organs are configured to be bendably elastic.

7. The device according to claim 1, wherein the catch organs comprise a rigid or rigid elastic component embedded in the bush material made of plastic or metal.

8. The device according to claim 1, wherein a cavity assigned to the catch organ is disposed within the elastomeric material, the catch organ dipping temporarily into said cavity during engagement.

9. The device according to claim 1, wherein at least one part of the bushes comprises two bush halves that face one another on the side of the passage opening, and mutually complement one another with mirror symmetry, which have a catch organ on sides facing away from one another, in each instance.

10. The device according to claim 9, wherein the bush halves are connected with one another, at one juncture in one piece, in hinge-like manner, and are open on the side that lies opposite the juncture, forming an edge opening.

11. The device according to claim 10, wherein the bush halves have a film hinge at the juncture.

12. The device according to claim 1, wherein the side walls that delimit the frame openings and lie opposite one another are oriented parallel to one another.

13. The device according to claim 12, further comprising catch depressions or catch projections assigned to the frame openings and disposed opposite one another as mirror images on the related side walls.

14. The device according to claim 1, wherein the passage openings of the bushes are disposed outside the center in the insertion direction, forming first and second wall parts of unequal thickness, said first wall part being thinner than said second wall part.

15. The device according to claim 14, wherein the catch organs of the bushes are asymmetrically disposed on the side of the second wall part.

16. The device according to claim 14, wherein two bushes are disposed in a respective frame opening, in such a manner that the first wall part of each of said two bushes rest against one another and the second wall part of each of said two bushes face away from one another.

17. The device according to claim 16, wherein only one bush can be arrested in each frame opening, in each instance, with the side walls of the frame opening.

18. The device according to claim 1, wherein the retaining frame can be screwed onto the edge of the hole through the wall.

19. The device according to claim 1, wherein the retaining frame is substantially rectangular and has first and second closed narrow side edges, a closed first broad side edge, and an open second broad side edge opposite to said open first broad side edge.

20. The device according to claim 19, wherein the retaining frame is provided with fixation tabs that project towards the side of the hole through the wall, and can be arrested on the edge of the hole through the wall, in the region of its closed narrow side edges.

21. The device according to claim 20, wherein the fixation tabs are configured as loose components that can be fixed in place with a positive lock in an adapted pass-through opening in the closed narrow side edges of the retaining frame.

22. The device according to claim 20, wherein the fixation tabs have a catch pocket that surrounds the edge of the hole through the wall, as well as a catch element that can engage on the retaining frame in the region of the pass-through opening.

23. The device according to claim 20, wherein the fixation tabs have an activation organ that projects beyond the retaining frame on the front, to produce and/or release the catch connection with the edge of the hole through the wall.

24. The device according to claim 1, wherein each catch organ has a spring stay with a free end and a catch cam molded onto the free end of the spring stay, said spring stay being oriented parallel to the side wall of the bush or the bush halves and bendable into a cavity in the elastomeric material in spring-like manner.

25. The device according to claim 1, wherein the catch organs are embedded in one of the bush halves, in each instance, as components that are separate from one another.

26. The device according to claim 1, wherein the catch organs are connected with one another by way of a connecting stay that penetrates or surrounds the bush.

27. The device according to claim 24, wherein the catch cams have a run-up incline that faces in the insertion direction, and a catch surface that follows the run-up incline at the back, facing opposite the insertion direction.

28. The device according to claim 24, wherein the catch depressions in the side walls are formed to be complementary to the catch cams of the bushes that form a closure piece.

29. A bush for a cable lead-through device having a retaining frame provided with frame openings having side walls, said bush comprising an elastomeric material, at least one passage opening for a cable, and two catch organs that project beyond the bush surface towards opposite sides, which can engage into catch depressions in the side walls of the frame openings;
wherein said bush comprises two bush halves that face one another on the side of the passage opening, and mutually complement one another, which have a catch organ on sides facing away from one another, in each instance.

30. The bush according to claim 29, wherein the catch organs are at least partially embedded in the elastomeric material.

31. The bush according to claim 29, wherein the catch organs are configured to be bendably elastic.

32. The bush according to claim 29, wherein the catch organs comprise a rigid or rigid elastic component embedded in the bush material made of plastic or metal.

33. The bush according to claim 29, wherein a cavity is formed within the elastomeric material, into which a catch organ can be bent during engagement.

34. The bush according to claim 29, wherein the bush halves are connected with one another, at a first juncture in one piece, in hinge-like manner, and are open on an opposite second juncture, forming an edge opening that leads to the passage opening.

35. The bush according to claim 34, wherein the bush halves have a film hinge at the first juncture.

36. The bush according to claim 29, wherein each catch organ has a spring stay with a free end and a catch cam molded onto the free end of the spring stay, said spring stay being oriented parallel to two opposite side walls and bendable into a cavity in the elastomeric material.

37. The bush according to claim 29, wherein the catch organs are embedded in the elastomeric material as components that are separate from one another.

38. The bush according to claim 29, wherein the catch organs are connected with one another by way of a connecting stay that penetrates or surrounds the bush.

39. The bush according to claim 29, wherein each catch organ has a catch cam comprising a run-up incline and a catch surface that follows the run-up incline by way of a catch edge.

40. The bush according to claim 29 wherein said two bush halves mutually complement one another with mirror symmetry.

41. A bush for a cable lead-through device having a retaining frame provided with frame openings having side walls, said bush comprising an elastomeric material, at least one passage opening for a cable disposed outside a central portion forming two wall parts of unequal thickness, and two catch organs that project beyond the bush surface towards opposite sides, which can engage into catch depressions in the side walls of the frame openings.

42. The bush according to claim 41, wherein the catch organs are disposed on the side of the thicker wall part.

* * * * *